UNITED STATES PATENT OFFICE.

HILLIARY ELDRIDGE, DANIEL JOHNSON CLARK, AND MAHLON W. WAMBAUGH, OF GALVESTON, TEXAS.

COMPOSITION OF MATTER FOR MANUFACTURING CALCIUM CARBID.

SPECIFICATION forming part of Letters Patent No. 571,084, dated November 10, 1896.

Application filed April 30, 1896. Serial No. 589,758. (No specimens.)

*To all whom it may concern:*

Be it known that we, HILLIARY ELDRIDGE, DANIEL JOHNSON CLARK, and MAHLON W. WAMBAUGH, citizens of the United States, residing at Galveston, in the county of Galveston and State of Texas, have invented a new and useful Composition for the Manufacture of Calcium Sodic Carbid, of which the following is a specification.

This invention relates to the manufacture of calcium sodic carbid; and it has for its object to provide a new and useful composition of matter for use in the manufacture of calcium sodic carbid.

To this end the main and primary object of the invention is to provide a composition of matter that will effect or insure the very rapid reduction and combination of the ingredients to form calcium sodic carbid on an economical commercial basis.

With these and other objects in view the invention essentially consists in a composition of matter composed of seventy-two bushels of quicklime, forty bushels of carbon, four bushels of soda, and one-eighth of a bushel of borax.

The proportions specified are such as are preferably observed in the manufacture of the carbid product, and in the manufacture of this product all of the ingredients are thoroughly pulverized and mixed together, after which the composition is subjected to the fusing heat of an electric furnace, thereby producing calcium sodic carbid with a trace of borax.

An important feature of the present invention is the use of the ingredients soda and borax in combination with the carbon and lime, it being noted that the soda and borax have an action on the lime similar to a flux or an acid. This action of the soda and borax greatly accelerates the reduction of the lime to metallic calcium, while at the same time the soda is reduced to metallic sodium, so that the carbon readily combines with the metallic sodium and calcium, thus rapidly forming the calcium sodic carbid with a trace of borax.

In order to carry out the invention on the most economical basis possible, carbonate of soda or common washing soda is used, but it will be understood that the water of crystallization is expelled from the carbonate of soda and borax by heat before mixing with the other ingredients.

Having thus described the invention, what we claim is—

A compound for the manufacture of calcium sodic carbid composed of quicklime, carbon, soda, and borax, substantially as described.

In testimony that we claim the foregoing as our own we have hereto affixed our signatures in the presence of two witnesses.

HILLIARY ELDRIDGE.
DANIEL JOHNSON CLARK.
MAHLON W. WAMBAUGH.

Witnesses:
S. L. GROVER,
V. E. AUSTIN.